W. B. ROGATZ.
METHOD OF MANUFACTURING CALCIUM CARBIDE.
APPLICATION FILED MAY 5, 1921.
1,422,135.
Patented July 11, 1922.
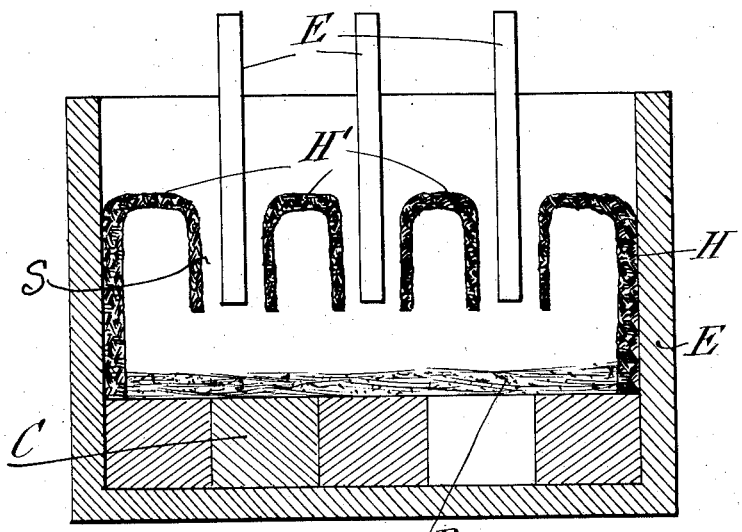
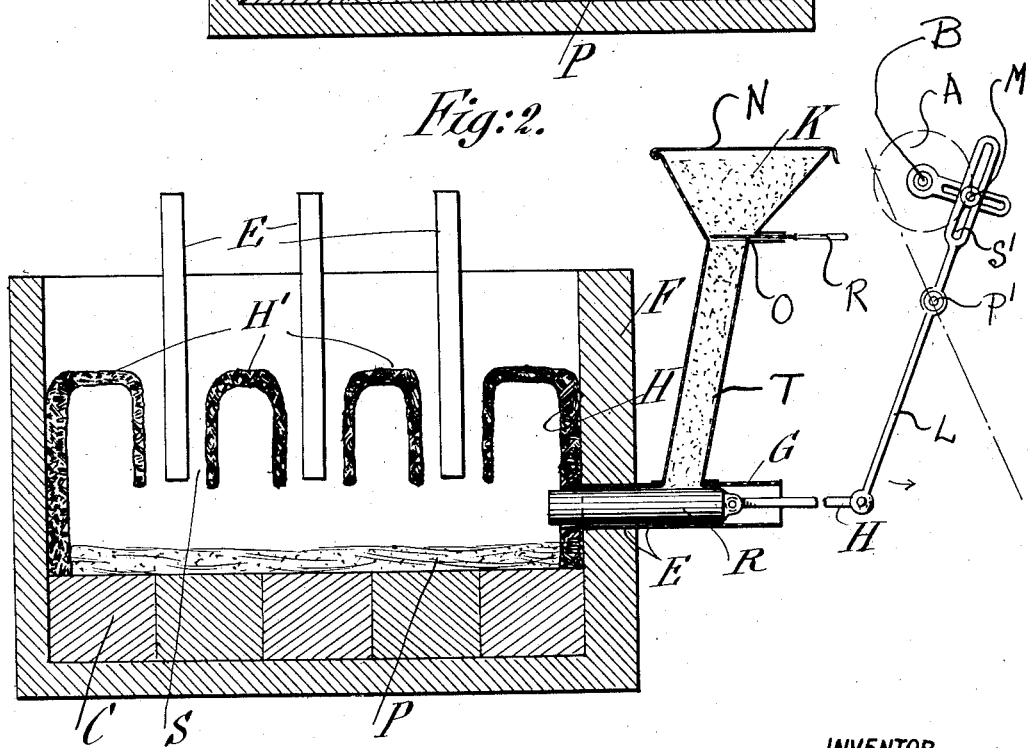
INVENTOR
William B. Rogatz
BY Mock & Blum
ATTORNEYS.

UNITED STATES PATENT OFFICE.

WILLIAM B. ROGATZ, OF PLATTSBURG, NEW YORK, ASSIGNOR TO FARMERS STANDARD CARBIDE CO., OF PLATTSBURG, NEW YORK, A CORPORATION OF NEW YORK.

METHOD OF MANUFACTURING CALCIUM CARBIDE.

1,422,135.   Specification of Letters Patent.   Patented July 11, 1922.

Application filed May 5, 1921. Serial No. 467,176.

*To all whom it may concern:*

Be it known that I, WILLIAM B. ROGATZ, citizen of the United States, residing at Plattsburg, in the county of Clinton and State of New York, have invented certain new and useful Improvements in Methods of Manufacturing Calcium Carbide, of which the following is a specification.

My invention relates to a new and improved method of manufacturing calcium carbide by means of the electric arc.

It has been well known for many years that a mixture of calcium oxide or lime and carbon in the form of coke or the like, when subjected to the heat of an electric arc, would combine so as to form calcium carbide.

The method of making this substance, and of operating the electric furnace therefor, has been as follows:

The furnace as originally made consisted of a shell made of steel or other suitable metal which was either cylindrical or had some other suitable shape. The bottom of the steel shell was lined with large blocks of carbon so as to form a protective floor for the furnace.

This floor together with the shell was then connected to the earth and then electrodes connected to a source of two-phase or three-phase current were placed with their ends sufficiently near the said floor, so that arcs were formed. The mixture of lime and coke or the like was then shovelled upon the floor so as to be acted upon by these arcs, so as to form a pool of molten carbide, and this molten carbide was tapped off from time to time. In the course of the operation of the furnace, some of the molten material ran to the upright lateral walls thereof and there it solidified because the electrodes were purposely so located that the heat at the lateral walls of the furnace was not great enough to maintain the molten material in its liquid condition. Hence a side wall or crust was gradually formed which acted as a protective lining for the metal walls of the furnace. This wall or crust was formed largely of the various impurities which enter into commercial lime such as magnesia and the like. After this protective crust had crept up to a certain height along the walls of the furnace, it now began forming closer and closer to the electrodes until finally the entire top of the furnace was arched over or covered by this protective lining, save for craters or holes adjacent the arcs, where the heat was great enough to prevent the crust from forming. This crust was very thick and strong and was so tough that it blunted all ordinary tools.

After this crust had been formed, ordinarily at the end of a few months, the fresh raw material or mixture to be acted upon could only be shovelled into the furnace through the spaces between the electrodes and the adjacent walls of the crust, and this meant that all the material to be acted upon had to be shovelled in through an opening or openings which was only a couple of inches in width. In the manufacture of calcium carbide from the ingredients above mentioned, tremendous volumes of gas are formed because a relatively small furnace can handle several tons of material a day, so that very large quantities of gases are formed and these had to escape through these narrow spaces between the crust and the electrodes. As a result, the upward blast of highly heated gases was extremely strong and the material had to be crushed in large heavy lumps or else instead of falling below the crust to be acted upon by the arch, it was simply swept upwardly by the ascending heated gases. Since the material had to be shovelled into these narrow spaces or otherwise put there in large lumps, it took quite some time before these lumps were softened by the heated gases and fell through to the heated zone below.

Hence, in order to have a furnace of large capacity, it has been found necessary to have very wide electrodes. The ordinary electrode heretofore used has not been less than thirty inches in diameter and in very large furnaces it has been customary to take a number of such electrodes and bolt them together so as to make an electrode perhaps thirty inches wide and many feet in length.

These electrodes are consumed quite rapidly by the heated oxygen which is probably produced from the melting and decomposition of the lime before the coke begins to react, so that the consumption of the electrodes is a source of considerable expense and great inconvenience because the operation of the furnace must be stopped while new electrodes are inserted.

According to my invention, the charge of material is fed into the furnace below the upper crust and above the top of the pool of molten material, so that if desired, the material can be crushed into much smaller pieces than have hitherto been used.

Another object of my invention is to widely separate the lumps of coke before they begin to soften, so that the formation of a sponge-like mass of softened coke is prevented.

Other objects of my invention will be set forth in the following description and drawings which illustrate a preferred embodiment thereof.

Fig. 1 shows the style of furnace now in use, the said furnace E having a floor made of carbon blocks C and having a protective lining formed as before-mentioned consisting of vertical walls H and top arches H'.

The electrodes E of which three are shown in this drawing enter the spaces S. As is well known in the art, the furnace E and the carbon blocks C are connected to the earth and vertical arcs are formed in the well-known manner between the carbon blocks C and the three electrodes E so as to melt the material and form the pool P.

To be able to carry out my new and improved method, the furnace F shown in Fig. 2 is originally formed with a hole at one or more points in the walls thereof, so that a pipe or pipes E may be inserted therein. When the furnace is set into operation, a carbon rod R is inserted into this hole or holes, so that it projects beyond the wall of the furnace to a distance slightly greater than the thickness of the crust H which will be formed.

Hence when the crust H is built up, an opening will be left therein at the place where the carbon rod or rods R is projecting through it and by suitably turning or moving the carbon rod R, while the crust H is being built up, these carbon rods are maintained free and separate from the crust so that they can be withdrawn at any time. The carbon rods R can be made of the same material as the electrodes E.

Hence, when the furnace has been in operation for several weeks, a crust is formed as before mentioned but the vertical walls H of this crust have a hole or series of holes formed therein, which holes register with a corresponding hole or holes in the wall of the furnace F. These holes are so chosen that they will be above the level of the molten material, the height of the pool P being determined by the amount of material fed into the furnace and the frequency with which the furnace is tapped. In Fig. 2, the holes are shown as being substantially horizontal but they could be inclined upwardly or downwardly to any extent desired. A chute T having a hopper K is connected to the pipe E and an extension pipe G is also connected thereto as shown.

The hopper K is provided with an upper removable cover N and a lower removable closure or valve O having a handle R. The rod I is pivotally connected to the rod H'' which is also pivotally connected to the lever L pivoted at P' and provided with a slot S'. The slotted lever secured to the shaft B of a wheel A is provided with a pin M so that a revolution of the wheel A which can be accomplished by hand or by any suitable source of power causes the lever L to oscillate from the position shown in full lines in Fig. 2 to the position indicated in dotted lines. It is to be understood that the drawings herein are diagramatic and that numerous mechanical details can be supplied by persons skilled in the art.

The operation of the furnace according to my method is as follows:

The valve O is moved so as to clear the chute T, the cover N is removed and the crushed mixture is poured into the hopper and chute until it fills the same. This crushed mixture, if desired, can be quite finely divided, and if desired, finely divided calcium carbide can also be thrown into the chute T so as to be remelted. The hopper K is now closed air-tight by means of the cover N. The carbon rod R is now reciprocated so as to admit some of the charge into the pipe E and then hurl it with considerable force into the furnace and above the pool P. Since the crushed material is intermittently fed into the furnace, and since each successive charge is violently shot into the furnace by the quick impact of the carbon rod R, the particles of the crushed material tend to widely separate. This is extremely important because if coke is fed into the furnace in finely divided form, and the finely divided particles are not separated, they tend to form a spongy mass of considerable size, which does not take any part in the usual reaction of the furnace, and is carried out when the furnace is tapped in the form of a large lump, which means that the calcium carbide secured from the furnace is not uniform and will yield unsatisfactory results in the generator. If desired, the rod R can be actuated at successive strokes with varying degrees of force so that for example, the first charge of material will fall into the pool and near the mouth of the pipe E, the next charge of material will fall into the pool somewhat further away therefrom, etc.

In the normal operation of the furnace, the electrodes E project below the bottom points of the upper crust H' and the same effect can be secured by violently impacting the finely divided material upon the electrodes or upon the opposite wall of the furnace, or upon the top crust in an inclined direction.

If two or more pipes E and the accompanying mechanism are used, the streams of crushed material which are hurled into the furnace may be caused to impinge upon each other with considerable force, so as to accomplish the desired scattering of pieces of crushed material.

If desired, the valve O can be moved so as to close the chute and the large hopper K can then be filled with crushed material and its cover N replaced, so that the chute T can be again filled up by opening up the air-tight valve O.

In this way the chute T can be kept continuously filled, without permitting air to enter through the holes of the furnace.

Lumps of material can be placed in the spaces S, so as to be melted by the ascending heated gases in the manner before mentioned, but any desired portion of the feeding of the material can be accomplished by the mechanism before described.

Since the lime can be fed into the furnace by means of the mechanism before described, in relatively large lumps, and the coke can be fed in a relatively finely divided form, the life of the electrodes is prolonged. When the coke is fed into the furnace in relatively large lumps as has been the practice up to the present time, the lime melts and decomposes so as to yield oxygen, while the large lumps of coke merely soften and do not begin to react upon the oxygen which is formed. This highly heated oxygen consumes the electrodes E even though they are made of very dense carbon.

By feeding in the coke in fine particles, the coke melts much more readily than the larger lumps of lime, and the oxygen evolved from the lime consumes the particles of coke which are fed in and thus the life of the electrodes is much prolonged.

Hence, if desired, the lime and coke mixture can be fed in through the openings S in the manner before described and a specified amount of finely divided coke can be fed in through the pipes E, so as to conserve the electrodes.

I have shown a preferred embodiment of my invention, but it is clear that numerous changes and omissions may be made without departing from its spirit.

The parts H and L can be made of wood or some other suitable non-conducting material so that no current can be transmitted.

If desired, the feed stroke of the rod R can be such, that instead of moving forwardly at uniform speed throughout, it moves slowly at the beginning of its stroke and the speed thereof increases so that the first particles of the charge fall into the pool quite near the pipe E and the others are gradually spread out further and further away from the mouth of pipe E.

I claim:—

1. In the art of making calcium carbide in an electric furnace, that step in the art which consists in feeding the material through the wall and side crust of the furnace and above the molten material in the furnace and below the top crust of the furnace.

2. In the art of making calcium carbide in an electric furnace, those steps in the art which consist in feeding in the lime in relatively large lumps and feeding in the carbon in relatively fine lumps and spreading out said lumps of carbon so that they cannot coalesce when they are heated to form a spongy mass.

3. In the art of making calcium carbide in an electric furnace, that step in the art which consists in feeding the charge in the form of separated lumps through the side wall and side crust of the furnace and above the molten material at the bottom of the furnace, the said lumps being fed into the furnace with varying velocities.

4. In the art of making calcium carbide in an electric furnace, that step in the art which consists in feeding the charge through the wall and side crust of the furnace and above the molten material therein, while preventing the access of air through the point of feeding.

5. In the art of making calcium carbide in an electric furnace, that step in the art which consists in sharply impacting the charge of material into the furnace through the side wall and side crust thereof and above the molten material therein.

6. In the art of making calcium carbide in an electric furnace, that step in the art which consists in feeding the charge through an opening in the wall and side crust of the furnace and above the molten material therein, and spreading out the particles of carbon so fed in as part of the charge in order to prevent them from coalescing into a spongy mass when they become softened by the heat.

In testimony whereof I hereunto affix my signature.

WILLIAM B. ROGATZ.